United States Patent
Carroll, Jr.

[11] 3,805,076
[45] Apr. 16, 1974

[54] NOBLE GAS SCINTILLATOR FOR MEASURING NEUTRON FLUX

[75] Inventor: Edward E. Carroll, Jr., Gainesville, Fla.

[73] Assignee: The United States of America as represented by the United States Atomic Energy Commission, Washington, D.C.

[22] Filed: May 8, 1973

[21] Appl. No.: 358,446

[52] U.S. Cl................ 250/365, 250/372, 250/390
[51] Int. Cl............................................. G01t 1/20
[58] Field of Search ......... 250/390, 391, 392, 374, 250/361, 389, 363, 365, 372; 313/610

[56] References Cited
UNITED STATES PATENTS
3,047,720  7/1962  Rickard .............................. 250/392
3,688,118  8/1972  Martina .......................... 250/389 X Primary Examiner—Archie R. Borchelt
Assistant Examiner—Davis L. Willis
Attorney, Agent, or Firm—John A. Horan; Bernice W. Freundel

[57] ABSTRACT

For measuring neutron flux in a power reactor, a long slender gas-containing tube is built into the reactor. The tube acts as a light pipe for scintillations from a secondary gas mixed with the first noble gas. The secondary gas produces a charged particle upon absorption of a neutron, which particle passes through the noble gas causing the emission of ultraviolet radiation. The tube is viewed from the upper open end by a photomultiplier. A variety of secondary gases may be used for neutron spectrum analysis and the device may also be used as a gas pressure thermometer.

3 Claims, 1 Drawing Figure

PATENTED APR 16 1974 3,805,076
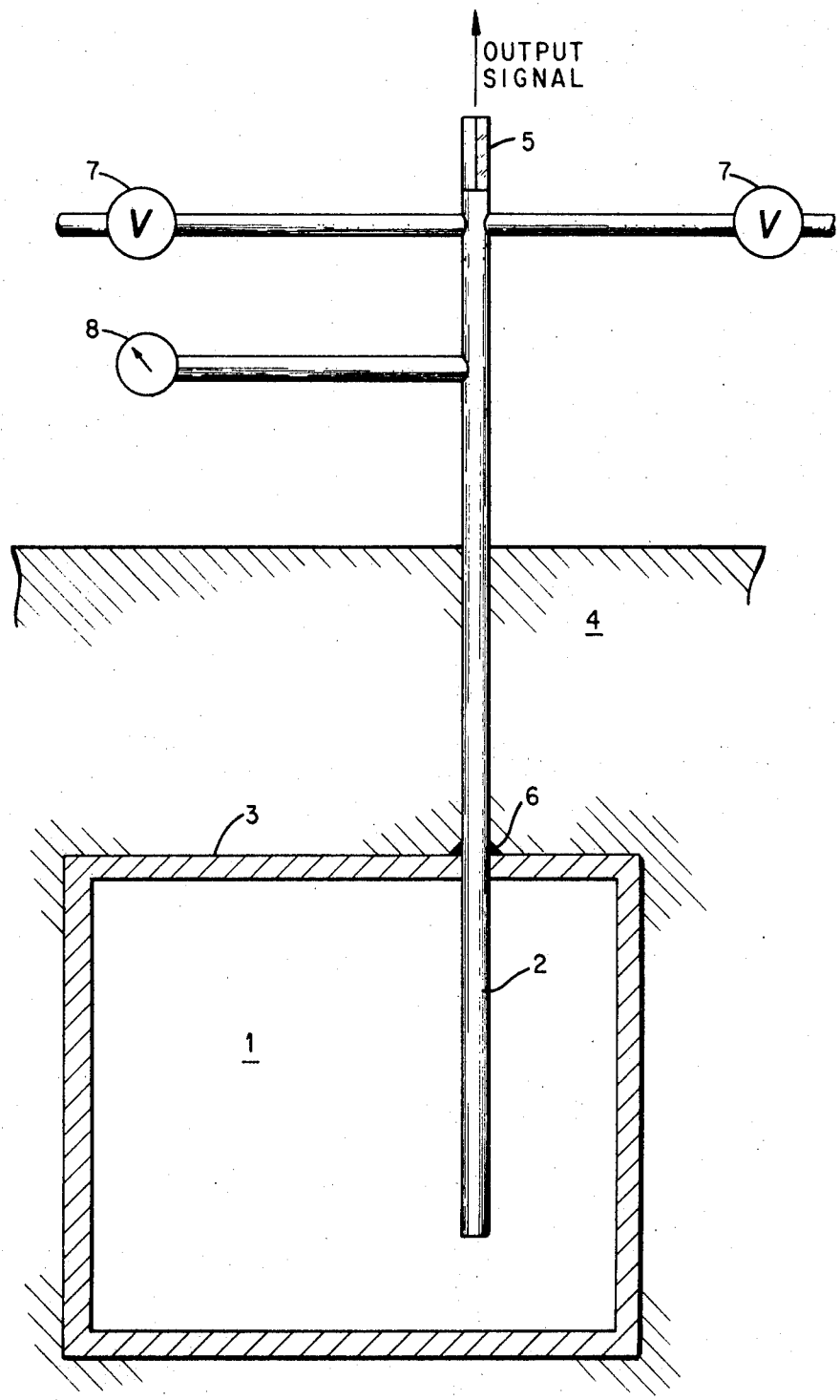

NOBLE GAS SCINTILLATOR FOR MEASURING NEUTRON FLUX

BACKGROUND OF THE INVENTION

This invention relates to reactor instrumentation for measuring neutron flux in the interior of a large power reactor. Very large power reactors often have design faults such as local disturbances in loading, poisoning, or power disturbances. The effects of these are propagated relatively slowly across the reactor. Different regions tend to be independent of any but the immediately adjoining regions. There is a need in such reactors for devices which will measure local variations in flux and power through 25 or more feet of shielding material.

In the past, neutron flux measuring devices have taken the form, in one instance, of an ionization chamber which conducts current substantially proportional to the instantaneous neutron flux. Another device has means for positioning foils in the neutron flux and means for determining the amount of activation of each of the foils. Still another flux profile plotting device comprises means for positioning a small radiation detector at various positions in the neutron flux to be measured.

The present invention has the object of providing an improved neutron flux measuring device which has a fast response, linearity over many decades of response, stability for long periods of time, each of repair or replacement, and complete operability at the temperature and radiation fields existing in the interior of a power reactor.

SUMMARY OF THE INVENTION

The device of the present invention encompasses a long slender polished tube mounted in the core of a power reactor. The tube is filled with a first noble gas, and a secondary gas. The secondary gas produces a charged particle upon absorption of a neutron. Upon passage of the charged particle through the noble gas ultraviolet radiation is emitted. The polished tube acts as a light pipe and a photomultiplier tube is placed to view the emanations from the light pipe tube. The photomultiplier tube is sensitive to ultraviolet rays. Output pulses from the P M tube may be utilized in a conventional manner to indicate neutron flux in the reactor interior.

BRIEF DESCRIPTION OF THE DRAWING

The invention will best be understood from the following description when read in conjunction with the accompanying drawing.

The FIGURE is a functional representation of apparatus suitable for measuring neutron flux in the interior of a large power reactor. The cylindrical core, designated 1, of the nuclear reactor contains a long slender highly polished stainless steel or other metal tube 2 which extends above the core 1 and through the pressure vessel 3 and shielding 4. The tube is filled with a first noble gas mixed with a secondary gas. The first gas may be $He^4$, Ar, or Kr at a temperature of 475°F. and at atmospheric pressure. The secondary gas is one which produces a charged particle upon absorption of a neutron, for example, $He^3$, $N^{14}$, or $UF_6$.

The lower in-core end of the tube is sealed while the upper end is open and is surmounted by a photomultiplier tube 5 which is positioned with its window viewing the inside of the tube 2.

The cylindrical core of the illustrated example may be 10 feet in diameter and 10 feet deep surmounted by 25 feet of shielding material. The tube will then be approximately 35 feet long with an inside diameter of one-half to three-fourths inch. The tube is welded in place to the pressure vessel as at 6.

A valving arrangement 7 at the top end of the tube 2 permits evacuation, refilling, or change of one gas for another. A remote indicating pressure gage 8 is also connected to the top of the tube, and may be used to determine temperature changes by pressure changes.

When the gas-filled tube is exposed to the neutron flux the secondary gas produces a charged particle. The noble gas in the tube acts as a scintillator and emits ultraviolet radiation upon the passage of the charged particle. The photomultiplier tube then responds to the ultraviolet radiation by producing a current pulse output signal.

The photomultiplier may also be used as a pulse counting device permitting pulse height analysis and some neutron spectrum analysis. The photomultiplier should have either quartz or sapphire windows. Fittings and seals are to be all metal or quartz to assure nonpoisoning of the gas. No wave length shifter need be used.

It is intended that more than one of these tubes be mounted in the reactor core, at varying heights, to provide axial as well as radial information. It would also be possible to place a movable sleeve in the tube, the sleeve having a highly polished interior and a closed lower end to furnish axial flux information.

There should be no radiation damage problems due to the simple construction and corrosion should be no problem in the tube due to the inert gas atmosphere. The instrument, like all noble gas scintillators, will be insensitive to gamma rays.

Noble gas scintillators are known in the art but have not been used in the present elongated geometry which forms its own light pipe which transmits radiation.

What is claimed is:

1. A noble gas scintillator for measuring neutron flux in a nuclear reactor comprising a long slender gas-contained tube built into the reactor core and extending through many feet of shielding, said tube having a sealed lower in-core end and an open upper out-of-core end, a photomultiplier tube mounted on the open end of said tube, said tube having a highly polished interior acting as a light pipe, said contained gas being a mixture of a first noble gas and a secondary neutron absorbing gas, said secondary gas producing charged particles causing the noble gas to emit ultraviolet radiations, said radiations being transmitted through the light pipe tube to activate the photomultiplier.

2. The scintillator as recited in claim 1 wherein the first gas is $He^4$ and the secondary gas is $He^3$.

3. The scintillator as recited in claim 1 wherein the first gas is Ar and the secondary gas is $N^{14}$.

* * * * *